United States Patent [19]
Day

[11] Patent Number: 5,519,296
[45] Date of Patent: May 21, 1996

[54] METHOD AND APPARATUS FOR SENSING GUIDEWIRE SIGNALS

[75] Inventor: Richard M. Day, Binghamton, N.Y.

[73] Assignee: The Raymond Corporation, Greene, N.Y.

[21] Appl. No.: 151,071

[22] Filed: Nov. 10, 1993

[51] Int. Cl.⁶ .................................................. B62D 1/24
[52] U.S. Cl. ............................................ 318/587; 180/168
[58] Field of Search ..................................... 318/587, 580, 318/581; 180/168

[56] References Cited

U.S. PATENT DOCUMENTS

| | | | |
|---|---|---|---|
| Re. 30,492 | 1/1981 | Blakeslee | 180/168 |
| 3,993,156 | 11/1976 | Rubel | 318/587 X |
| 4,307,329 | 12/1981 | Taylor | 318/587 |
| 4,329,632 | 5/1982 | Yashida et al. | 318/587 |
| 4,613,804 | 9/1986 | Swenson | 318/587 |
| 4,918,362 | 4/1990 | Christensen et al. | 318/587 |
| 5,245,335 | 9/1993 | Hill et al. | 180/168 X |

*Primary Examiner*—Brian Sircus
*Attorney, Agent, or Firm*—Salzman & Levy

[57] ABSTRACT

The present invention features a material handling vehicle that is capable of operating in a manned mode, a wire guidance mode, and a rail guidance mode. This manned material handling vehicle contains a steering management control system comprising a logic program which allows the vehicle to adapt itself to different wire control systems. That is, the particular parameters, frequency and amplitude of the underlying wire guidance system can be determined. In this manner, the manned vehicle is universally adaptive to a wide variety of wire guidance systems.

17 Claims, 7 Drawing Sheets

LL - LOAD LEFT COIL
LR - LOAD RIGHT COIL
TL - TRACTOR LEFT COIL
TR - TRACTOR RIGHT COIL
LNW - LOAD NEARWIRE COIL
TNW - TRACTOR NEARWIRE COIL

DLCP - DISPLACEMENT AT LOAD COILPAIR IN INCHES
DTCP - DISPLACEMENT AT TRACTOR COILPAIR IN INCHES
LLCP - LENGTH FROM LOAD AXLE TO LOAD COILPAIR
LTCP - LENGTH FROM LOAD AXLE TO TRACTOR COILPAIR $K\_\Psi$, K_DFW AND K_CORRECTION ARE SCALING CONSTANTS
DFW - CALCULATED DISTANCE FROM WIRE
$\Psi$ - CALCULATED HEADING ANGLE
$\Psi = ((TL - TR) - (LL - LR)) * K\_\Psi$
$DFW = ((LL - LR) * K\_DFW) - (\Psi * K\_CORRECTION)$

METHOD AND APPARATUS FOR SENSING GUIDEWIRE SIGNALS

RELATED APPLICATION

This patent application is related to co-pending patent application, Ser. No. 08/150,708, filed concurrently, titled "Guidewire Controls for a Manned, Material Handling Vehicle".

1. Field of the Invention

The present invention pertains to guidewire controls and, more particularly, to a set of antennae for material handling vehicles that is capable of adapting to frequencies and amplitudes of diverse guidewire systems.

BACKGROUND OF THE INVENTION

Unmanned vehicles have heretofore been guided through a warehouse or other storage facility by guidewire control systems. In addition, many manned material handling vehicles (such as forklifts, reach-trucks and order-pickers) can be alternatively controlled by a wire guidance system. Such additional control is a valuable operative feature.

The use of pairs of coils disposed on the vehicle centerline, in order to generate an error signal indicative of vehicle deviation from the embedded or buried wire, is also well known, as illustrated in U.S. Pat. No. 4,307,329 (issued to Taylor on Dec. 22, 1981).

U.S. Pat. No. 3,993,156 (issued to Rubel on Nov. 23, 1976), discussed in greater detail hereinbelow, discloses a pair of main coils arranged with their axes horizontally located between the wheels of a vehicle.

Designing a manned vehicle for wire guidance operations continues to pose several problems. Each warehouse facility that has installed guidewire controls for guided vehicles operates the controls at different wire frequencies and amplitudes that are designed for its own distinct wireguided system. Any mass-produced (non-customized) material handling vehicle must, therefore, have the capability of detecting (acquiring), recognizing and responding to the different frequencies and amplitudes of warehouse wire guidance systems.

It would be advantageous to provide one or more antennae capable of acquiring guidewire signals under adverse conditions.

It would also be advantageous to provide an antennae system capable of linearizing response over a relatively great distance.

It would also be advantageous to provide an antennae system that could correct automatically for varying signal levels (i.e., that could provide automatic gain control), and that could also adapt to a large range of signal levels from the guidewire.

SUMMARY OF THE INVENTION

In accordance with the present invention, there is provided a material handling vehicle that is capable of operating in a manned mode, a wire guidance mode, and a rail guidance mode. This manned material handling vehicle contains a steering management control system comprising a logic program which allows the vehicle to adapt itself to different wire control systems. That is, the particular parameters, frequency and amplitude of the underlying wire guidance system can be determined. In this manner, the manned vehicle is universally adaptive to a wide variety of wire guidance systems. The antennae coils are oriented vertically with respect to the surface over which the vehicle travels. For each of two sets of antenna coils, a nearwire and two guidance coils are configured in proximity to one another in order to linearize the guidance antennae over a relatively great distance. Signals generated by the guidance coils can be adjusted for each antenna independently, as a function of the nearwire signal to correct for varying signal levels. This adjustment is accomplished by comparing the nearwire signal to a set reference value to generate a relative signal ratio for each of the antennae, and then multiplying the relative signal ratio by the difference between the two guidance channel signals of each of the antennae to generate a difference signal independent of the amplitude of the guidewire signal. Moreover, the gain of each of the antennae can be set independently to compensate for atypical signal conditions. The system is capable of automatically aligning the vehicle with the guidewire, even when one of the antennae is out of receiving range. This alignment is accomplished by directing the vehicle to approach the guidewire at an angle of convergence calculated as a function of velocity of the vehicle and as a function of distance from the vehicle to the guidewire.

DESCRIPTION OF THE PREFERRED EMBODIMENT

Generally speaking, the invention pertains to an electronic steering system for operating material handling vehicles in either a manned or an otherwise guided mode. This steering system comprises a logic program that adapts to, and learns, the frequencies and amplitudes of any particular guidewire. Failure to sense the guidewire signal will cause the steering control to switch to manual operation. This steering system employs fuzzy logic for controlling the steering unit.

Figure 1:
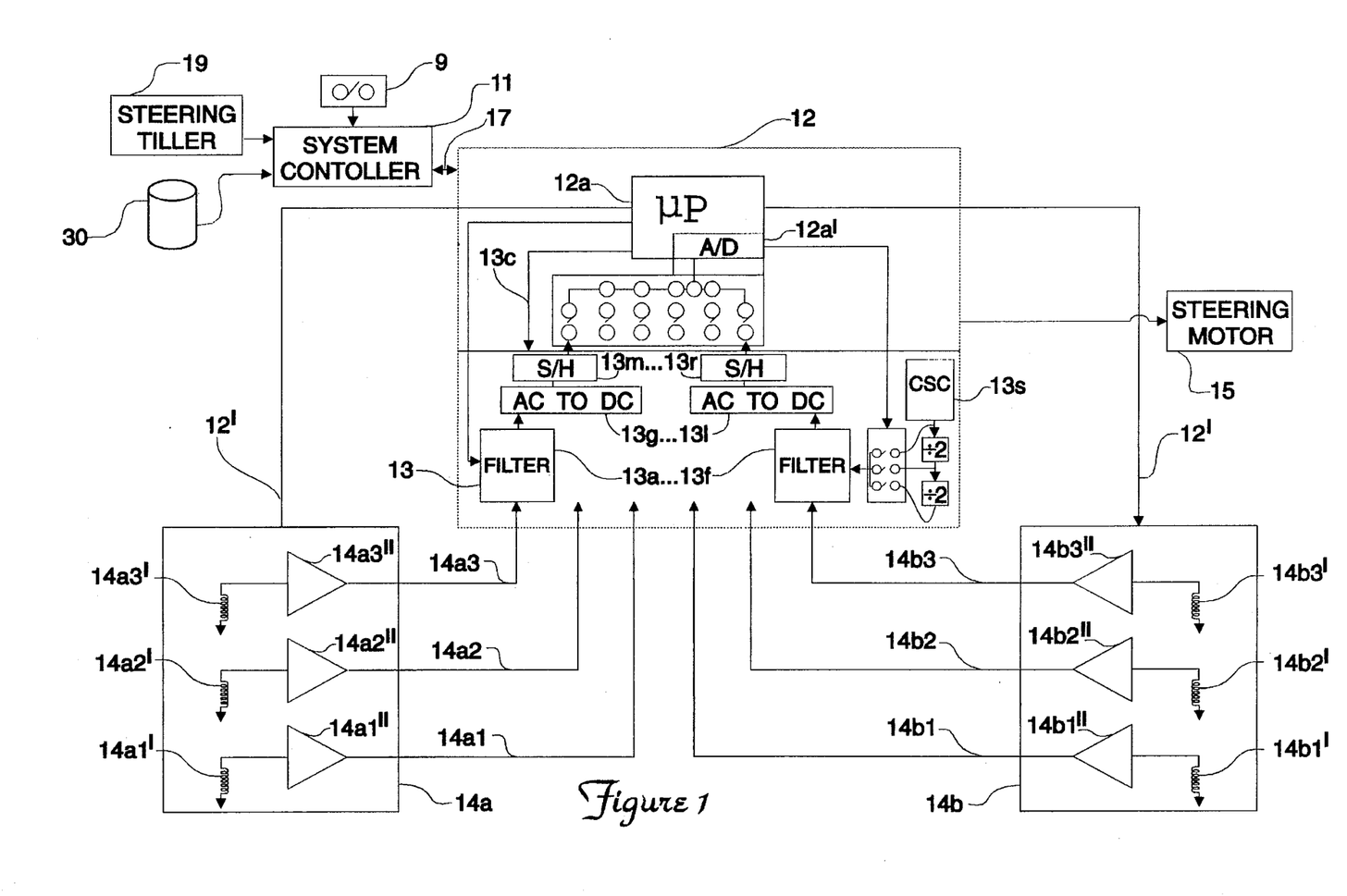
FIGS. 1 and 2 are schematics of the invention.
Figure 2:
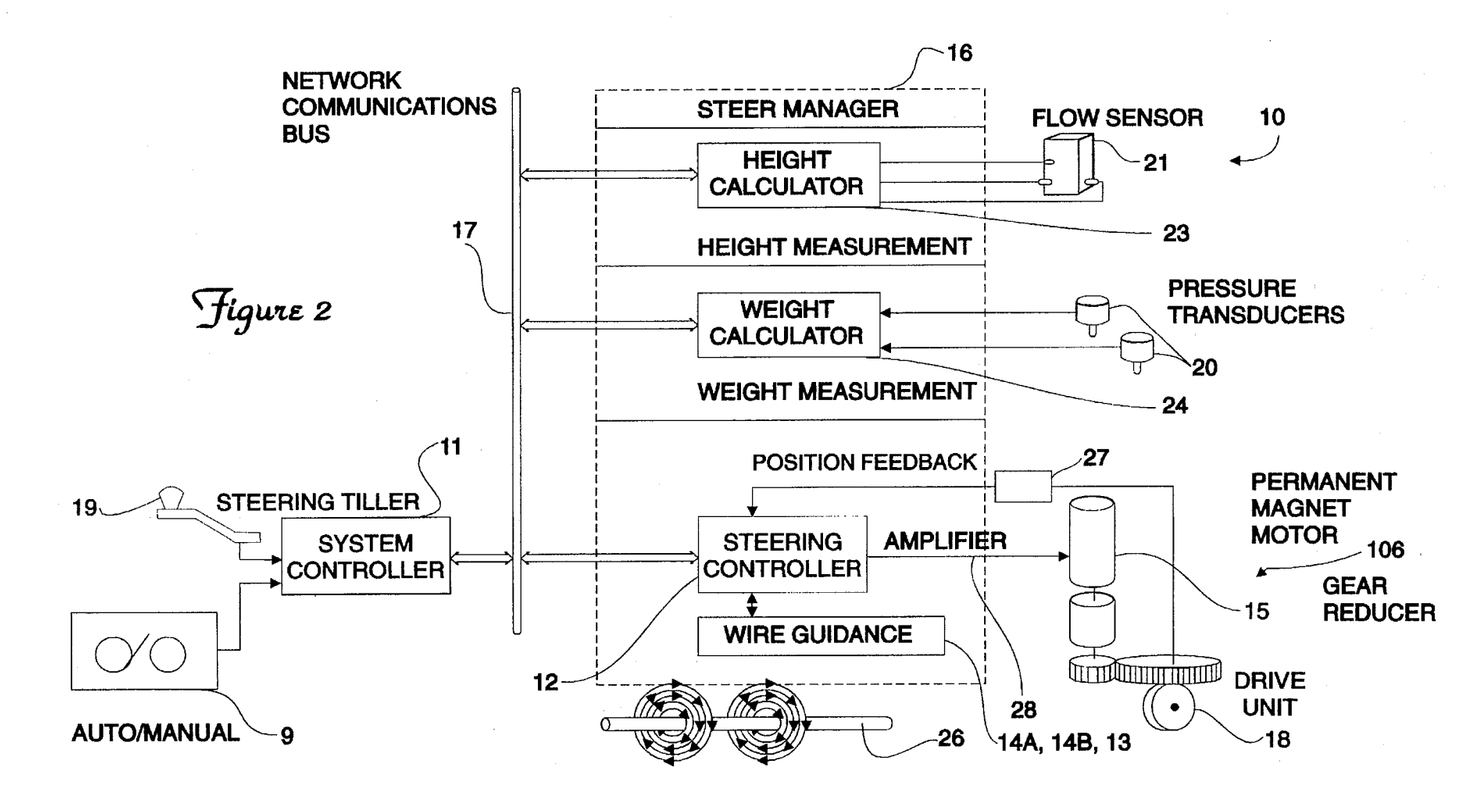

Now referring to FIGS. 1 and 2, schematic diagrams of the control system 10 of this invention are illustrated. The control system 10 comprises a system controller 11 that communicates with a steering controller 12 via a communications bus 17. The system controller 11 is responsive to the manual direction signal provided by a steering tiller 19, an AUTO/MANUAL switch 9, and vehicle speed, as represented by a traction encoder 30. A steer manager 16 (FIG. 2) is programmed with fuzzy logic; the steer manager 16 controls the operational modes (i.e., either a manual or a wire guidance mode) of the steering controller 12. Steering controller 12 has two basic tasks, to wit, managing the overall operation of the steering system and positioning the drive unit (steer motor 15 and steer wheel or drive unit 18), based on commands from either the operator's steering tiller 19 or the information provided by wire guidance (antennae 14a and 14b, respectively).

The logic program of the steer manager 16 also provides for the configuration of several system variables which allow the operation of the vehicle to be customized for or by the user, not shown.

A positioning routine in the fuzzy logic program utilizes a signal denoting where the drive unit 18 is to be positioned; it then determines where the drive unit 18 is actually positioned and generates the necessary commands to move it to the desired position. The fuzzy logic program is developed using the fuzzy logic package Fide Version 1.03, from Aptronics Corp.

The steering controller 12 receives signals from the pair of wire guidance antennae 14a and 14b, respectively, and uses these signals to control the steering motor 15, and hence the attitude of the reach-truck or order-picker (not shown) via the steer wheel 18.

Figure 3:
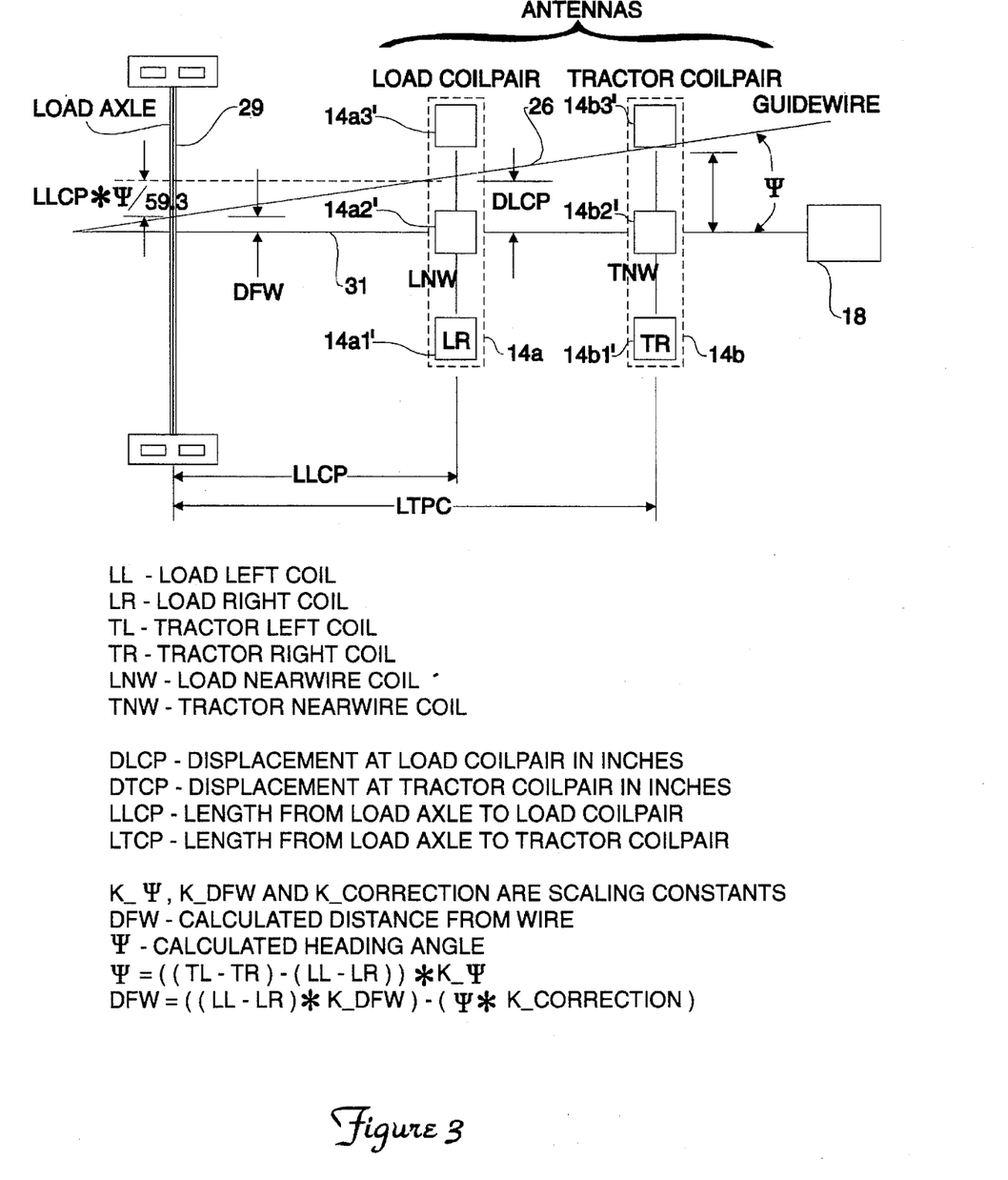
FIG. 3 shows specific details of the antenna.

Referring now also to FIG. 3, the antennae 14a and 14b monitor the frequency and amplitude signals in a guidewire 26. The antennae 14a and 14b are shown disposed on the vehicle centerline 31. In order to guide the vehicle, the fuzzy logic program performs the calculations shown at the bottom of FIG. 3 and described hereinbelow.

The antenna, comprising components 14a and 14b, is the basic unit of the wire guidance system. Its function is to determine the lateral position of the guidewire 26 relative to the centerline 31 of the vehicle, not shown, at the antenna location. Each antenna 14a and 14b operates independently of any other antenna in determining the lateral position of the guidewire 26. The outputs of different antennas can then be combined to provide additional position information, such as heading angle, as described in the aforementioned U.S. Pat. No. 4,307,329 (hereinafter Taylor).

Referring again to FIG. 1, each antenna 14a and 14b comprises three independent channels: a nearwire channel 14a2, 14b2, respectively, and two guidance channels 14a1, 14a3 and 14b1, 14b3, respectively. In the interest of simplifying the present description, only antenna 14a and components associated therewith will be described in detail, since antenna 14b operates identically. The nearwire channel 14a2 is used to measure the amplitude of the signal from the guidewire 26. This information is used in two ways: to determine if the guidewire signals are of sufficient strength for proper operation, as discussed in the Taylor patent; and, additionally, to adjust the output of the guidance channels 14a1, 14a3 to correct for varying signal levels. This second application is commonly referred to as automatic gain control (AGC).

The guidance channels 14a1, 14a3 are used together to determine the lateral position of the guidewire 26 as described in the Taylor patent. Typically the output of one channel (say, 14a1) is subtracted from the output of the other channel (14a3) and then the difference is scaled to represent lateral guidewire position. In the present device, this differencing is performed by a microprocessor unit 12a in the steering controller 12. Microprocessor 12a includes a multiplexed input A/D converter 12a' for receiving signals from each antenna channel.

Differencing has a disadvantage in that its value is proportional to the amplitude of the signal received from the guidewire 26. Thus, if the amplitude of the wire signal decreases to zero, the difference will also decrease to zero. In the present device, automatic gain control is applied in order to prevent the amplitude of the difference signal from depending on signal strength from the guidewire 26.

Operation of the automatic gain control consists of an AGC algorithm that measures the amplitude of the received signal in the nearwire channel 14a2 independently in each antenna, and then compares the measured values against a set reference value in the form of ratios:

*Relative Signal Ratio=Reference Value÷Measured Value*

This ratio is calculated independently for each antenna, 14a and 14b. Additionally, the magnitude of this ratio is constrained to a value of between 0.7 and 5 in order to prevent the magnification of noise signals. The differenced output of the guidance coils at each antenna (say 14a) are then multiplied by the Relative Signal Ratio for that antenna 14a in order to make the differences independent of the amplitude of received signal. These ratios and multiplications are performed by microprocessor 12a in the steering controller 12.

Each of the antenna channels has the same basic structure. The signal from the guidewire 26 is received by each channel (say 14a1) using an antenna coil 14a1' and the received signal is amplified by an amplifier 14a1" for transmission to the steering controller 12. The amplifiers 14a1", 14a2", 14a3" are provided with sixteen individual gain selections set in linearly spaced steps in order to advantageously provide for adapting to a large range of signals from the guidewire 26. This scheme is used in conjunction with the aforementioned AGC algorithm to extend the operating range of the antennae 14a, 14b.

Selection of a particular gain value is controlled by the microprocessor 12a in the steering controller 12 using four digital control lines 12' and 12", respectively for each antenna 14a and 14b. The gain of each antenna 14a, 14b can be set independently in order to allow compensation for reduced or increased signal conditions caused by locating the antenna at different heights and/or in proximity to objects in the vehicle frame which cause distortion of the magnetic field about the guidewire 26. These gain selections are changed as part of the process of learning the characteristics of the guidewire 26, described in greater detail hereinbelow. The value of gain selected is chosen in order to operate the signal channel in an optimum manner, so it will have the maximum amplitude signals possible without saturating or clipping.

The antenna coils 14a1', 14a2', 14a3' are located and oriented in a vertical plane in order to provide maximum immunity to noise signals generated by sources other than the guidewire 26. The guidance coils 14a1', 14a2', 14a3' are located so as to straddle the guidewire 26, as shown in FIG. 3. The outputs of these coils 14a1', 14a2', 14a3' are arranged so as to be in phase, even though they are independent channels, in order to provide maximum noise immunity. Since the guidewire 26 position is determined by subtracting two channels (14a1 from 14a3, for example), any common-mode noise received is cancelled out.

In the Taylor patent, the nearwire antenna coil consists of a single coil located at the center of the antenna. In the present device, however, this nearwire antenna coil 14a2' actually consists of two separate antenna coils (shown as one in the FIGURE) which are wired together in series. One of the two antenna coils 14a2' is located on each side of the guidewire 26 when the antenna 14a is centered thereover, in order to extract additional benefits from the application of the automatic gain control.

Automatic gain control cannot be applied to the nearwire channel in the Taylor patent because the output of the nearwire channel would then cause severe distortion in the displacement calculation. The two coils comprising the nearwire antenna 14a2 are used together to provide a relatively constant output over a range of antenna displacement in order to prevent the described distortion. The automatic gain control then properly responds only to signal level variations.

Figure 4:
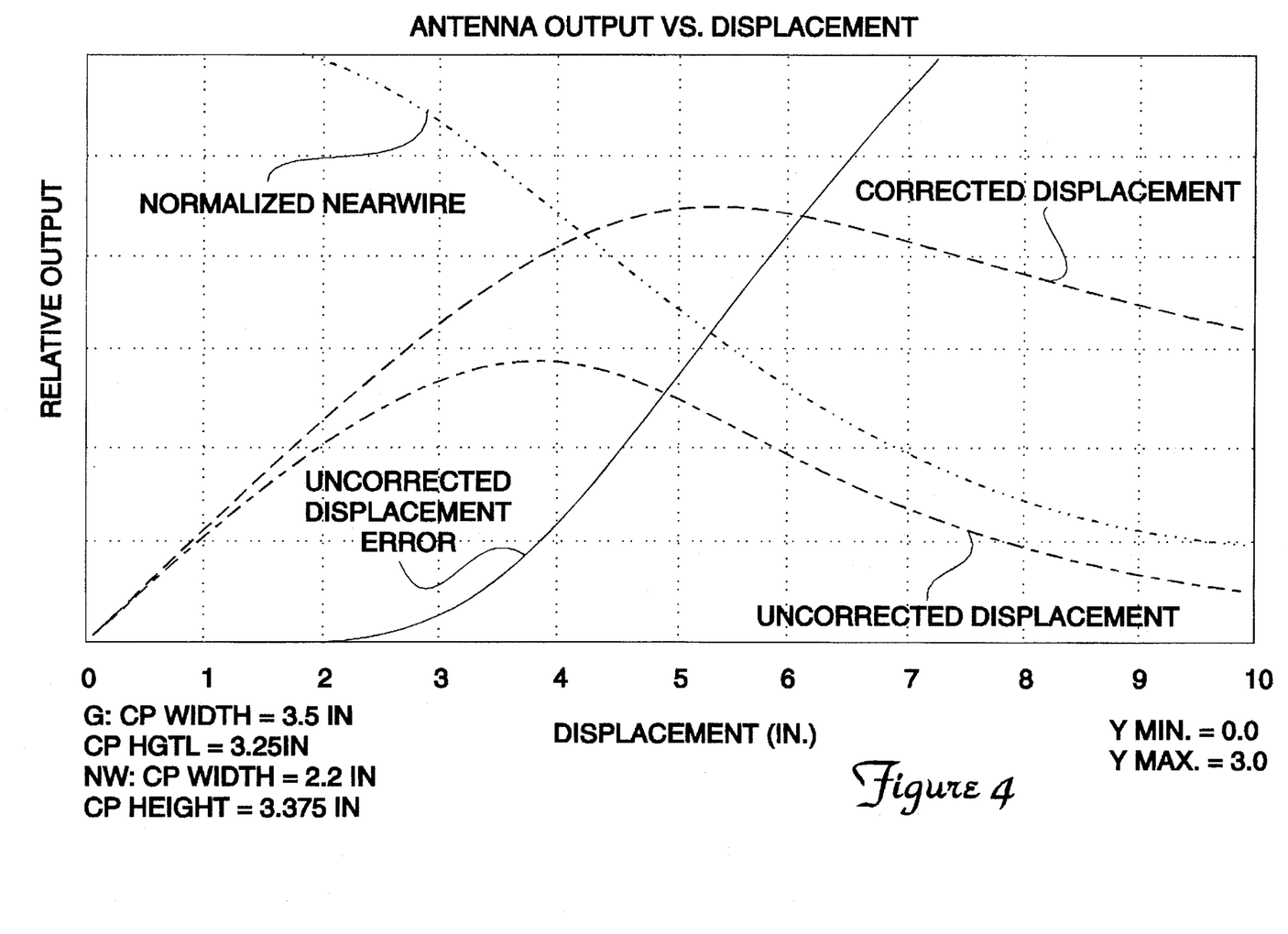
FIG. 4 is a graph of Antenna displacement verses displacement.

The operation of the AGC algorithm is additionally enhanced in the present invention by carefully arranging the actual geometry between the guidance 14a1, 14a3 and nearwire 14a2 antennae. The differenced output of the guidance antenna coils 14a1', 14a3', is generally quite linear between the coils, but peaks when either coil is directly over the guidewire 26 and then quickly falls off to zero. This relationship is shown in FIG. 4, labeled "Uncorrected Displacement" and limits the useful range of the antenna to its physical width. In a similar fashion, the output of the nearwire antenna 14a2 is at a maximum when the antenna 14a is centered over the guidewire 26. It then falls off to zero as the displacement is increased. This relationship is shown in FIG. 4, labeled "Normalized Nearwire".

The nearwire antenna 14a2 is designed to have a relatively constant output over the range where the differenced output of the guidance channels is linear (approximately between 0 and 2 inches on FIG. 4). Nearwire antennae output then begins to fall off at a rate approximately proportional to the rate at which the differenced output decreases from a linear output. In other words, the normalized nearwire output is a mirror image of the Uncorrected Displacement Error shown in FIG. 4. This relationship causes the automatic gain control algorithm to advantageously extend the operating range of the differenced output of the guidance channels 14a1, 14a3. This relationship is shown as "Corrected Displacement" on FIG. 4. Since the antenna range is extended by this technique, a much smaller antenna with the same range as that described by the Taylor patent can be constructed.

U.S. Pat. No. 3,993,156, issued to Rubel, describes an antenna coil arrangement and algorithm for providing extended operating range. The patented device employs two horizontally oriented coils for measuring displacement and two substantially vertical coils oriented in a plane approximately 20 degrees from vertical. This antenna is unable to reject common mode noise signals due to its horizontally-oriented guidance coils. Moreover, construction is relatively expensive, due to its required concentric coils at specific angles.

Referring again to FIG. 1, the signals from the antennae 14a and 14b are sent to a signal processing or filter card 13. This card 13 processes each antenna signal separately by filtering the signals using bandpass filters 13a, ..., 13f and converting the signals to DC signals referenced to ground. These signals are then converted to digital signals using the analog to digital (A/D) converter 12a' in the microprocessor 12a.

Noise rejection of the antennae 14a, 14b is an important aspect of the invention, but additional measures are employed as well. The DC output of all channels 14a1, ..., 14b3 is fed simultaneously to respective sample and hold devices 13m, ..., 13r, which freeze all channel outputs at the same moment in order to maximize common-mode noise rejection.

Filtering of the signals is important to remove unwanted signals generated by external devices such as power lines, lighting, etc. The antennae 14a and 14b are broadband receivers, by design, in order to allow reception of a variety of guidewire signals. The invention employs filters 13a, ..., 13f of the switched capacitor type which are digitally programmable. In the preferred embodiment, these filters 13a, ..., 13f are manufactured by Maxim Corp. as part number MAX261. These filters 13a, ..., 13f are programmed for a predetermined center frequency by application of a sampling clock, not shown, generated by an oscillator 13s and two divide-by-two (÷2) registers on the filter card 13 and by a 6-bit digital word 13t generated by the microprocessor 12a. The sampling clock can be changed to three different values by the steering controller microprocessor 12a in order to extend the operating range of the bandpass filters 13a, ..., 13f. The 6-bit digital word 13t allows changing of the center frequency in 1% logarithmic steps. The combination of the 6-bit digital word 13t and selectable sampling clocks allow the microprocessor 12a to sweep the filter center frequency in order to find the frequency of the guidewire 26, as described in greater detail hereinbelow with reference to FIGS. 5a and 5b.

Another noise suppression method employed is a rate-limiting algorithm which limits the maximum rate of change of the differenced output of the two guidance channels 14a1, 14a3 to a set value. This technique limits the response to disturbance signals for smoother operation, while avoiding phase-lag problems inherent in a low-pass filter. The maximum allowed value is additionally changed to different values based on whether the vehicle is automatically acquiring the guidewire 26 or has already successfully locked thereonto. The maximum rate is greatly reduced when locked onto the guidewire 26 for smooth operation.

The present invention is capable of bidirectional travel on a straight guidewire 26. It is also capable of automatically acquiring guidewire 26 in two ways. The operator may drive the vehicle until it is oriented substantially over the guidewire 26 and then move the AUTO/MANUAL switch 9 to the automatic position, causing the system to assume steering and align the vehicle with the guidewire 26. Alternately, the operator may move the AUTO/MANUAL switch 9 to AUTOMATIC prior to being in proximity to the guidewire 26. The system will then assume steering only when one and/or both of the antennae 14a and 14b are in proximity to the guidewire 26 such that sufficient signal is received. The vehicle will then be automatically steered so as to align it with the guidewire 26.

The antennae 14a and 14b shown in FIGS. 1 and 3, previously described, are used together in some cases, and are used individually in other cases. Normal bidirectional operation on the guidewire 26 uses both antennae 14a and 14b together. Alternatively said antennae are used individually during acquisition of the guidewire 26 and/or in the event that one antenna 14a and/or 14b fails while both are being used together. The operation of the antennae 14a and 14b changes during acquisition of the guidewire 26 from individual operation to dual operation as soon as the minimum required signal is received in each antenna 14a and 14b.

Use of the antennae 14a and 14b together is similar to that described in Taylor, with the addition of several enhancements. A disadvantage of the Taylor arrangement is the inability to move the antennae away from the fixed axle of the vehicle while maintaining bidirectional operation. Moving the antennae away from the fixed axle is an advantage in that the antennae can be located on the vehicle more easily and can also be moved to a location which provides additional protection from damage.

An additional disadvantage of the Taylor design is the reliance on fixed antenna dimensions whereas flexible dimensions can better provide for the needs of a plurality of different vehicles.

Operation of the present invention provides for the use of both antennae 14a and 14b together, as described hereinafter.

The calculations for the heading angle ($\psi$) should remain the same as that in existing systems:

$$\psi = (DLCP - DTCP) * K\_\psi$$

where:

DLCP is the corrected displacement at the load measured coil pair

DTCP is the corrected displacement at the tractor measured coil pair

K_ψ is a scaling factor to yield output in degrees.
K_ψ is a function of the amplifier gains and the distance between coil pairs:

$$K\_\psi = (57.3 * K\_DFW)/(LTCP-LLCP)$$

where:

LTCP is the length from load axle to tractor coil pair

LLCP is the length from load axle to load Coil pair

K_DFW is a distance from wire scaling constant, determined by geometry and gain of amplifiers 14a1" through 14a3".

The dimensions LTCP and LLCP may be positive or negative as dictated by operational and physical needs of the vehicle.

The vehicle's distance from the wire should be calculated at the load axle 29, rather than at the sensor location. If it is not calculated at the load axle 29, then the DFW signal will favor one direction of travel over the other. Since it is more likely for designers to mount the sensor on the tractor end, the tractor's first travel will be aided and forks-first travel will be impeded, if DFW is not calculated at the load axle. This is very undesirable, since, due to vehicle geometry, it is more difficult to steer a vehicle in the forks-first direction.

To calculate the distance from wire (displacement) at the load axle 29, displacement at one coil pair and the vehicle heading angle must be known.

$$DFW = DLCP - LLCP * \psi/57.3$$

The distance from wire (DFW) and heading angle (ψ) signals are then combined (FIG. 6) as described hereinbelow.

The steer manager 16 accepts the industry standard frequencies 5.2 KHz or 6.25 KHz as configurable guidance frequencies. This information is transmitted to the steer manager 16 via the network communications bus 17 during initialization of the system.

The steer manager 16 records steering unit control parameters such as minimum steering effort and maximum rate of rotation. First the vehicle must be elevated far enough so that there is no friction between the drive wheel 18 and the floor surface, not shown. The steer manager 16 is then commanded by the system controller 11 to record these parameters. This is accomplished by incrementing the drive value to the steer motor 15 until the steer unit 106 (FIG. 2) moves ½ degree. The drive value is accordingly recorded and henceforth considered to be the minimum steering effort. Then the PWM to the steer motor 15 is set to "full" until the steer unit 106 moves 90 degrees. Recording time yields the maximum rate of rotation.

Figure 5A:
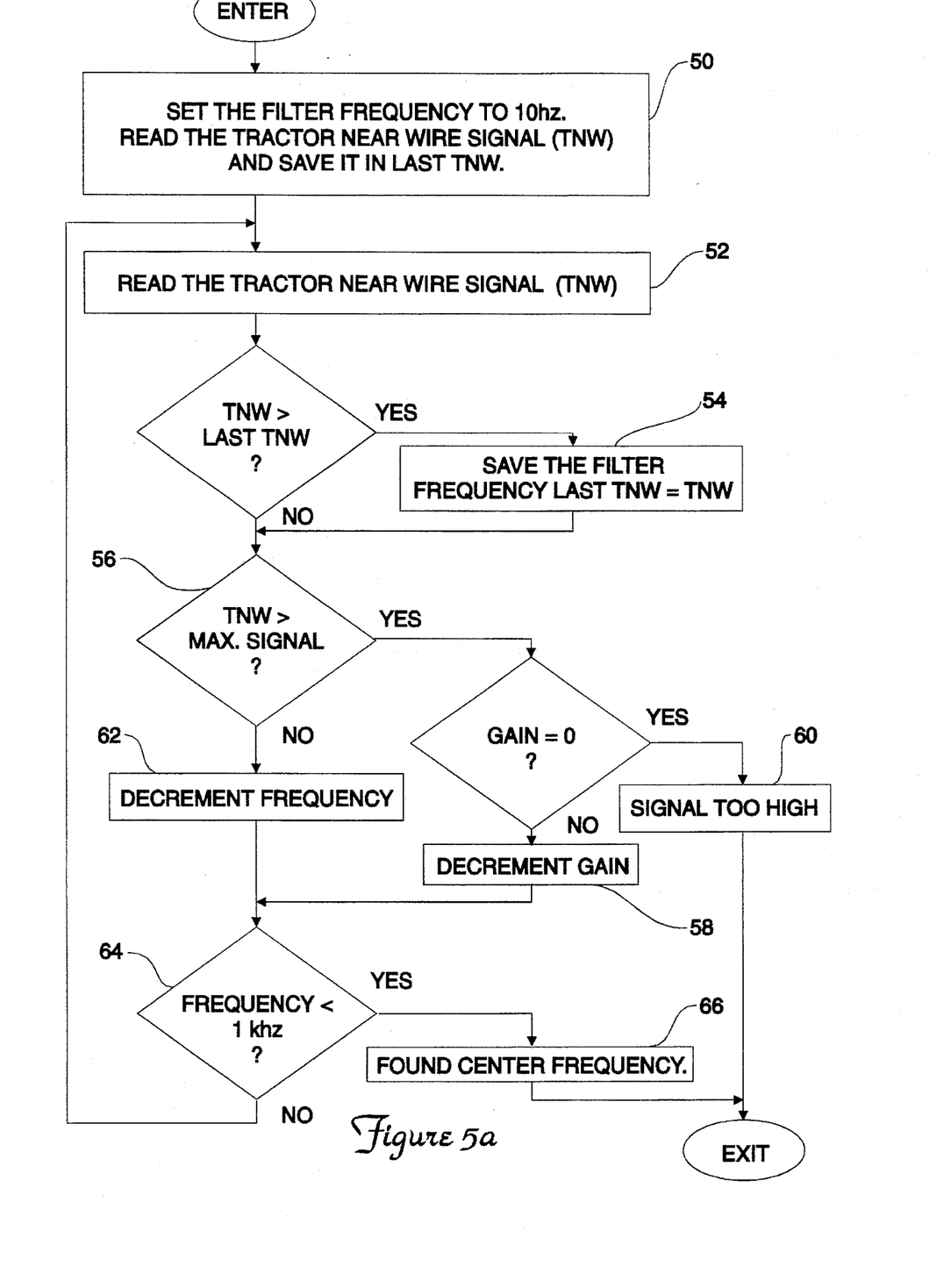
FIGS. 5a and 5b are block diagrams of a method of determining frequency and adjusting a gain.

FIG. 5a describes the process used for determining the guidewire frequency. First the programmable filters' center frequency and gain are set to their maximum values, step 50. The Tractor Near Wire (TNW) signal is continuously monitored, step 52. A trap for maximum signal of TNW and the current center frequency setting is performed, shown generally at step 54. If, during this process, the TNW signal becomes saturated, step 56, the gain is reduced, step 58. If the gain is at its minimum, then the guidewire signal is too strong for proper wire guidance, step 60, and the learning process is aborted. Otherwise, the center frequency is then decreased, step 62, to a minimum allowable frequency, step 64. After the full frequency range has been scanned, the center frequency has been found, step 66.

After determining the center frequency (FIG. 5a), the gain of the antennae 14a and 14b must be adjusted. This is accomplished using the process described in FIG. 5b. The filters are set to the aforementioned center frequency and the antennae gains are again set to their maximum limits, step 68. The Tractor Nearwire (TNW) and Load Nearwire (LNW) signals are continuously monitored, step 70. If the TNW signal is greater than its maximum usable voltage, step 72, the TNW gain is reduced, step 74. If the TNW signal is less than the maximum usable voltage, step 72, and also greater than its minimum usable voltage, step 76, then the tractor antennae gain has been found, step 78. However, if the TNW signal is less than the minimum usable voltage, step 76, then the guidewire signal is too weak for proper wire guidance, step 80.

Figure 5B:
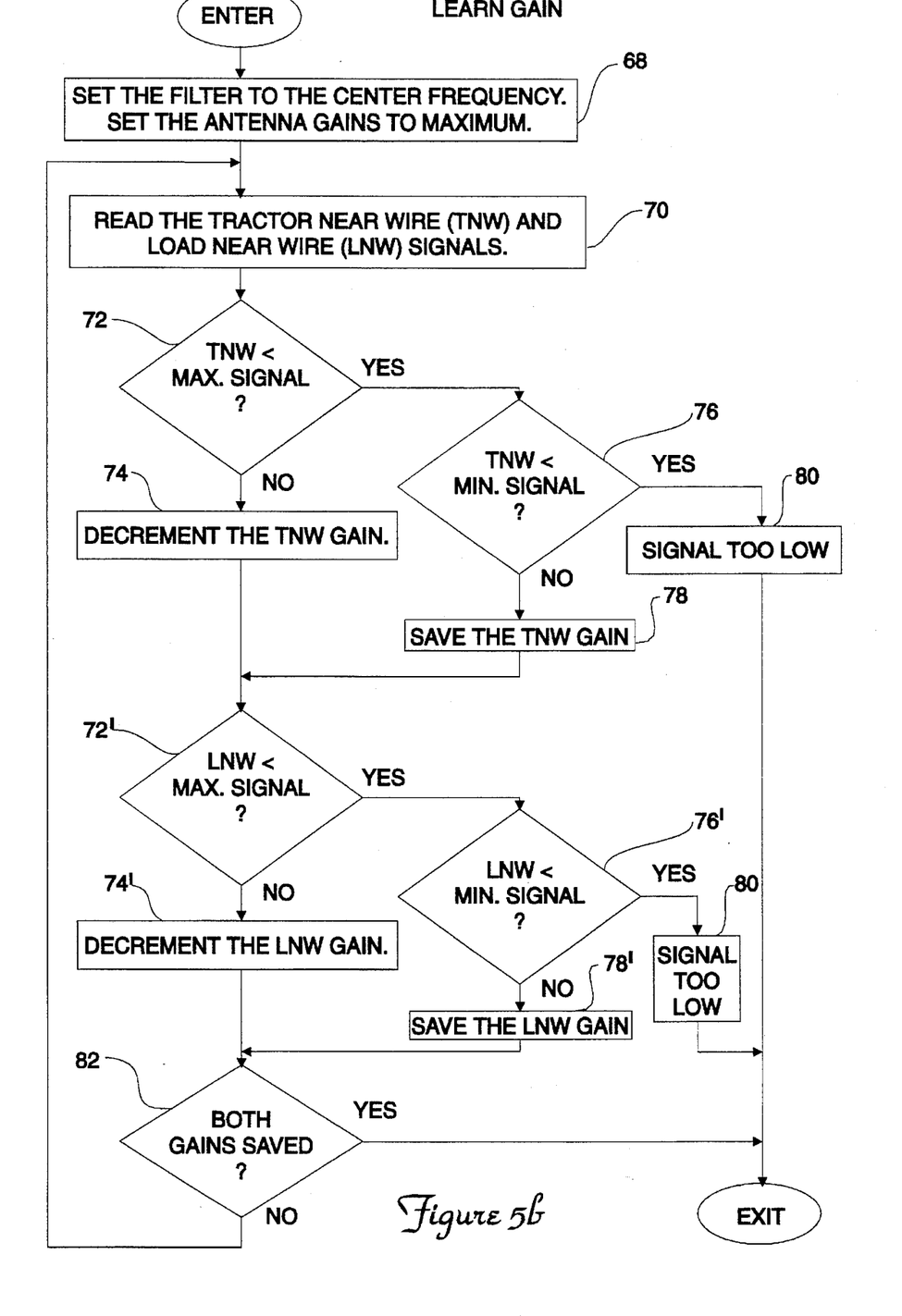

The same process is performed on the LNW signal, as indicated by steps 72'–80' on FIG. 5b.

After both antennae 14a, 14b have had their gains set, the learning process is complete, step 82.

Management of the steering system requires information from the vehicle, such as the position of the auto/manual switch, not shown, vehicular speed, and travel direction. The steer manager 16 has access to this information through its interface to the network communication bus 17. This interface allows all of the vehicular computers (not shown) to work together as a single, seamless unit; it also allows the steering information to be registered directly on the operator's displays (not shown).

The steer manager 16 also has its own interface devices for the vehicle's steering components. An amplifier 28 within the steer manager 16 directly drives the steering motor 15, as shown. The position of the drive unit 18 is determined by monitoring the signals from a feedback device 27 connected to the drive unit 18. The commands to the steering motor 15 are derived using fuzzy logic from the position error (actual position minus requested position) and the rate of change of the position error.

The steer manager 16 determines the appropriate time to switch from manual to automatic steering and vice-versa. If the AUTO/MANUAL switch 9 is in the manual position, the input from the operator's steering tiller 19 is generally used. Exceptions are made only when an error condition prevents manual steering.

The AUTO/MANUAL switch 9 is provided for operating the vehicle in either mode. In the "automatic" position, the signals from the respective wire guidance antennae 14a and 14b are used to steer the vehicle when certain conditions are met. Automatic steering begins only when a guidewire 26 of the appropriate frequency and signal strength is detected. Ability to acquire wire is limited by vehicle physical features such as mass, steer rate, traction, and response time. If the sensor overshoots the guidewire 26 due to excessive speed and/or an acquisition angle outside of a nominal range, the steering immediately reverts to the manual mode. If the guidewire signal disappears while the vehicle is acquiring it, or while it is locked thereonto, the steering again immediately reverts to the manual mode. Steering also reverts to manual mode under .any conditions that prevent proper wire guidance operation, such as antenna or guidewire failure.

The steer manager 16 interacts with the vehicle through its interface to the network communications bus 17, as aforementioned. The steer manager 16 reads and writes to the bus 17 in a timely manner to provide sufficient updates of information throughout the vehicle. The steer manager 16 also detects any failure of the communications network and/or the information provided by the bus 17, taking necessary and appropriate actions.

The steer manager 16 provides information about the steering system (such as drive unit position, steering status, error conditions, and maintenance mode information) to the system controller 11.

The steer manager 16 detects any condition of poor steering function performance, due to either long delays in responding to commands and/or limited maximum rotation rates. If the steer manager 16 determines that the vehicle has deviated from the wire by 3° of heading angle or 3" of distance from wire, a message is sent to the system controller 11. The limits of 3° and 3" are, of course, arbitrary, and can be configurable by the system controller to lower values, if desired.

Proper wire guidance includes stopping the vehicle due to excessive distance from wire and/or angular deviation. Steering does not revert to manual mode under this condition, unless the antenna range is exceeded.

The steer manager 16 also provides a rail guidance feature wherein the drive unit is turned to a straight-ahead direction and actively held there. Both the operator's steering tiller 19 and the wire guidance signals are ignored. This feature is used to reduce stress on the traction system and scuffing of the drive tire, not shown.

The steer manager 16 is capable of recording drive unit performance parameters such as maximum rate of rotation, steering effort (torque) while standing, response delay time of amplifier 28, response delay time of motor 15, and average following error.

Figure 6:
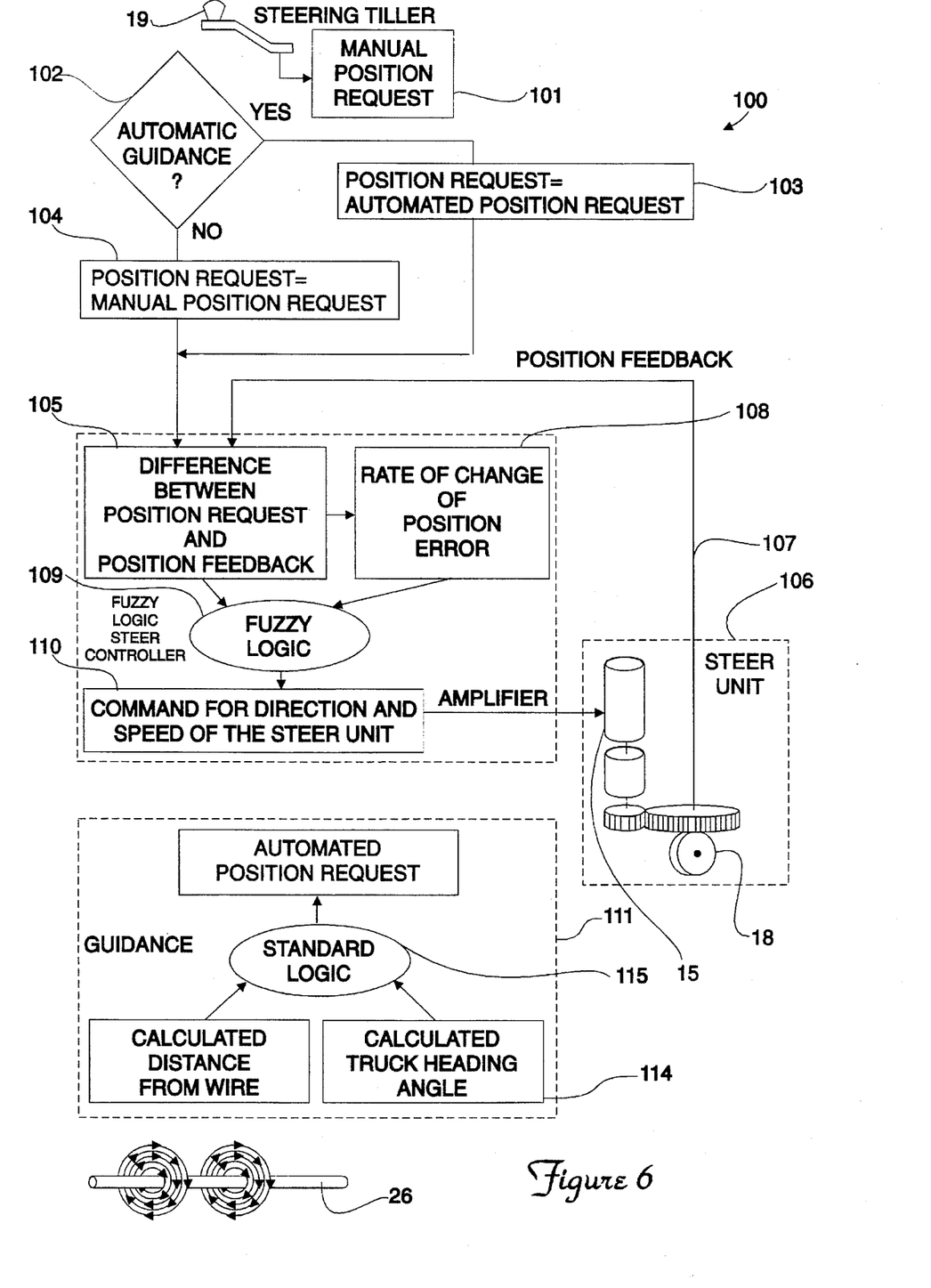
FIG. 6 is an operational diagram of the invention.

Now referring to FIG. 6, a flow chart 100 of the logic program of this invention is illustrated. When the vehicle is first powered-up and the "deadman", not shown, has been activated, the drive unit 18 (FIG. 2) is automatically set to the straight-ahead position. The steer manager 16 broadcasts a message informing other systems of its readiness. The steer manager 16 periodically broadcasts the actual position of the drive unit 18. In the manual mode of operation, the tiller 19 provides a manual position request 101, shown as signal "B".

A decision block 102 of the logic program determines whether the system AUTO/MANUAL switch 9 is in the AUTOMATIC mode. If the system is on automatic control, step 103, the position request is equal to the automated position request, as indicated by the signal shown as "A". The distance from wire is calculated, step 112, and the vehicle heading angle is calculated, step 114, using the formula in FIG. 3. The DFW and ψ (heading angle) are used to calculate the automatic position request "A" step 115 in accordance with the following equations:

For two antennae:

$$\text{Automated Position Request} = K_1 * DFW \pm K_2 * \psi \text{ where } K_1 \text{ and } K_2 \text{ are scaling constants (as per Taylor).}$$

For one antenna (e.g., tractor antenna), when vehicle is being guided on wire, when the other antenna is out of range:

$$\text{Automated Position Request} = K_3 * DTCP \text{ where } K_3 \text{ is a scaling constant.}$$

For one antenna (e.g., tractor antenna), when the vehicle is acquiring wire:

$$\text{Automated Position Request} = V_f * DTCP + K_4 * \Delta DFW$$

where $$V_f = \frac{9}{3 + |\text{vehicle velocity}|}$$

$K_4$ is a scaling constant
$\Delta DFW$ is the difference of relative wire position over time.

If either calculation (step 112 or step 114) is beyond the tolerance required, a signal is provided to the system controller 11 informing it of the aforementioned condition. If the manual mode is active, step 102, the position request is set equal to the manual position request, step 104. Either automated position request signal "A" or manned position request signal "B" is fed to block 105. A position feedback signal 107 is also fed to block 105 from the steer unit 106. Block 105 determines the error between the requested signal and the feedback position. An appropriate signal is generated and the rate of change of the steering position error is calculated, step 108. Both determinations from blocks 105 and 108 are fed to a fuzzy logic routine 109, developed using the fuzzy logic package, as aforementioned. The fuzzy logic routine 109 provides a signal which is used to produce a command for direction and speed, step 110, that is sent to the steer motor 15, as shown.

The rule-based fuzzy logic definitions of input and output variables, along with rules used in the preferred embodiment, are shown below in the FIL language.

```
$ e is the error of steer_request-motor_position
> e "error" : -127 (1) 127 [
    NB (@-127, 1, @-75, 1, @-50, 0),
    NM (@-75, 0, @-50, 1, @-25, 0),
    NS (@-50, 0, @-25, 1, @5, 0),
    ZO (@-20, 0, @0, 1, @20, 0),
    PS (@-5, 0, @25, 1, @50, 0),
    PM (@25, 0, @50, 1, @75, 0),
    PB (@50, 0, @75, 1, @127, 1),
    NZ (@-60, 0, @-5, 1, @5, 1, @60, 0)
]; $end of labels
$ de is the current position - last position
> de "delta error" : -127(1) 127[
    NB (@-127, 1, @-112, 1, @-75, 0),
    NM (@-112, 0, @-75, 1, @-38, 0),
    NS (@-76, 0, @-38, 1, @0, 0),
    ZO (@-38, 0, @0, 1, @38, 0),
    PS (@0, 0, @38, 1, @75, 0),
    PM (@38, 0, @75, 1, @112, 0),
    PB (@75, 0, @112, 1, @127, 1)
];
$ pwm is the voltage to operate the steer motor
< pwm "PWM" : -127(1)127*(
    NB = -127,
    NM = -38,
    NS = -15,
    ZO = 2,
    PS = 15,
    PM = 38,
    PB = 127
);
if e is PB then pwm is PB;
if e is NB then pwm is NB;
if e is PM then pwm is PM;
if e is NM then pwm is NM;
if e is PS then pwm is PS;
if e is NS then pwm is NS;
if e is ZO then pwm is ZO;
if e is NZ and de is PB then pwm is NB;
if e is NZ and de is NB then pwm is PB;
if e is NZ and de is PM then pwm is NM;
if e is NZ and de is NM then pwm is PM;
if e is NZ and de is PS then pwm is NS;
if e is NZ and de is NS then pwm is PS.
```

Referring again to FIG. 2, the steer manager 16 also calculates the height of the vehicle's mast via a height calculator 23 and a hydraulic flow sensor 21. The weight of the carried load is additionally calculated via a weight calculator 24 and pressure transducers 20 that are carried on the forklift platform, not shown. It is necessary to determine the load's weight and height in order to control the speed by which the vehicle is safely operated.

Currently, in order to learn the flow pulses between the mast switches on a vehicle, 12 lift/lowers are performed with the last 6 lifts averaged for the up flow pulses and the last 6 lowers averaged for the down flow pulses. As the temperature of the hydraulic fluid increases, the number of flow pulses between the mast switches increase.

Since the up and down flow pulses of the flow sensor increase with the temperature of the hydraulic fluid, up and down calibration units are needed for multiple temperatures. To properly record the up and down calibration units the lift/lower request must continuously be greater than 80% of maximum range and travel must cross both mast reference switches.

To get the calibration units at multiple temperatures, a table is used. The table has the up calibration units, the down calibration units, and a flag that will determine if the calibration units for that temperature have been recorded. The index into the table is the temperature which ranges from 10° C. to 90° C. in 10° increments.

| °C. | Up Calibration Units | Down Calibration Units | Recorded Flag |
|---|---|---|---|
| 10 | XXXX | XXXX | X |
| 20 | XXXX | XXXX | X |
| 30 | XXXX | XXXX | X |
| 40 | XXXX | XXXX | X |
| 50 | XXXX | XXXX | X |
| 60 | XXXX | XXXX | X |
| 70 | XXXX | XXXX | X |
| 80 | XXXX | XXXX | X |
| 90 | XXXX | XXXX | X |

The "X" values represent values that are arbitrarily defined.

The "X" values represent values that are arbitrarily defined.

There are two types of calibration recording processes: one that runs under Learning Mode and the other that runs under Normal Operation Mode.

Under the learning mode, when the request is received to record the calibration units, the recorded flags are reset. The up calibration units and the down calibration units are recorded for the nearest temperature at the time of the request.

For example, when the conditions above are met to properly record the calibration units and the temperature is at 31° C., the up and down calibration units are then recorded for that temperature in the table and the recorded flag for 30° C. is set.

| °C. | Up Calibration Units | Down Calibration Units | Recorded Flag |
|---|---|---|---|
| 20 | XXXX | XXXX | 0 |
| 30 | 22942 | 23590 | 1 |
| 40 | XXXX | XXXX | 0 |

The "X" values represent values that are arbitrarily defined.

The "X" values represent values that are arbitrarily defined.

Under Normal Operation Mode, the height is continuously calculated and is not hampered by this process. The temperature is continuously monitored. The height calibration units will need to change as the temperature changes up or down. The calibration units used will be determined by indexing into the calibration table using the temperature as the index. The nearest calibration units for that temperature, with the calibrated flag set, are used.

The calibration units are updated only if not previously recorded and the proper conditions above are met. The up and down calibration units will be recorded and stored in the table at that temperature and the recorded flag set.

For example, if the temperature is 40° C., and the calibration units have not been previously recorded, and the proper conditions above are met, then the up and down calibration units for that temperature are stored in the table and the learn flag for 40° C. is set.

| °C. | Up Calibration Units | Down Calibration Units | Recorded Flag |
|---|---|---|---|
| 20 | XXXX | XXXX | 0 |
| 30 | 22942 | 23590 | 1 |
| 40 | 23000 | 23650 | 1 |
| 50 | XXXX | XXXX | 0 |

The "X" values represent values that are arbitrarily defined.

The "X" valves represent values that are arbitrarily defined.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of determining lateral position of a wire-guided vehicle with respect to a guidewire, comprising:

a) providing a pair of antennae, each antenna of said pair having:

$a_i$) a nearwire channel for measuring an amplitude of a signal from the guidewire disposed adjacent the guided vehicle and for generating a first normalized signal representative of a reference value of said guidewire with respect to said guided vehicle, and $a_{ii}$) two guidance channels for determining a lateral position of said guidewire and for generating, respectively, second and third signals representative of the lateral position of said guided vehicle with respect to said reference value; and b) independently adjusting said respective second and third signals of each of said antennae, as a function of said first signal to correct for varying signal levels.

2. The method of determining lateral position of the wire-guided vehicle with respect to the guidewire in accordance with claim 1, further comprising:

c) setting a gain of each of said antennae independently to compensate for atypical signal conditions.

3. The method of determining lateral position of the wire-guided vehicle with respect to the guidewire in accordance with claim 2, further comprising:

d) learning characteristics of said guidewire, and wherein said step (c) is performed after learning the characteristics of said guidewire.

4. The method of determining lateral position of the wire-guided vehicle with respect to the guidewire in accordance with claim 1, wherein each of said antennae channels comprises at least one coil disposed substantially vertically with respect to a travel surface supporting said guided vehicle, and defining a path of travel of said wire-guided vehicle.

5. The method of determining lateral position of a wire-guided vehicle with respect to a guidewire in accordance with claim 4, wherein said nearwire channel comprises two coils, each being respectively disposed on either side of said guidewire when said respective antenna is disposed thereabove, so that a substantially constant amplitude signal of said nearwire channel is attained over a predetermined range of antenna displacement.

6. The method of determining lateral position of the wire-guided vehicle with respect to the guidewire in accordance with claim 5, further comprising: reducing noise and mounting tolerance sensitivities of said antennae without reducing the predetermined range of antenna displacement.

7. The method of determining lateral position of the wire-guided vehicle with respect to the guidewire in accordance with claim 1, wherein said step (b) of adjusting said second and third signals comprises:

$b_i$) comparing said first normalized signal representative of said amplitude of said guidewire signal to a set reference value to generate a relative signal ratio for each of said antennae; and $b_{ii}$) multiplying said relative signal ratio by a difference between said second and third signals of said antennae to generate a corrected displacement error signal independent of said first signal representative of said amplitude of said guidewire signal.

8. The method of determining lateral position of the wire-guided Vehicle with respect to the guidewire in accordance with claim 7, further comprising: normalizing nearwire output approximately as a mirror image of the difference between an idealized linear output and said corrected displacement error signal.

9. The method of determining lateral position of the wire-guided vehicle with respect to the guidewire in accordance with claim 7, when one of said guidance channels is out of range, further comprising:

c) directing said wire-guided vehicle to approach said guidewire at an angle of convergence calculated as a function of velocity of said guided vehicle and as a function of distance thereof from said guidewire.

10. An apparatus for determining lateral position of a wire-guided vehicle with respect to a guidewire, comprising:

a pair of antennae, each antenna of said pair having:

$a_1$) a nearwire channel for measuring an amplitude of a signal from the guidewire and for generating a first normalized signal representative of a guidewire reference value, and $a_2$) two guidance channels for determining the relative lateral position of said guidewire with respect to the guided vehicle and for generating, respectively, second and third signals representative thereof; and means for independently adjusting said respective second and third signals in each of said pair of antennae, as a function of said first signal to correct for varying signal levels.

11. The apparatus for determining lateral position of the wire-guided vehicle with respect to the guidewire in accordance with claim 10, further comprising:

means for setting a gain of each of said antennae independently to compensate for atypical signal conditions.

12. The apparatus for determining lateral position of the wire-guided vehicle with respect to the guidewire in accordance with claim 10, wherein each of said antennae channels comprises at least one coil disposed vertically with respect to a travel surface supporting said wire-guided vehicle defined by a path of travel of said wire-guided vehicle.

13. The apparatus for determining lateral position of the wire-guided vehicle with respect to the guidewire in accordance with claim 12, wherein said nearwire channel comprises at least two coils, each of said two coils respectively being disposed on either side of said guidewire when said respective antenna is disposed thereabove, so that an approximately constant amplitude signal of said nearwire channel is attained over a predetermined range of antenna displacement.

14. The apparatus for determining lateral position of the wire-guided vehicle with respect to the guidewire in accordance with claim 13, further comprising means for reducing the noise and mounting tolerance sensitivities of said antennae without reducing said predetermined range of antenna displacement.

15. The apparatus for determining lateral position of the wire-guided vehicle with respect to the guidewire in accordance with claim 10, wherein said means for adjusting said second and third signals comprises:

means for comparing said first signal representative of said amplitude of said guidewire signal to a set reference value to generate a relative signal ratio for each of said antennae; and means for multiplying said relative signal ratio by a difference between said second and third signals of said antennae to generate a corrected displacement error signal independent of said first signal representative of said amplitude of said guidewire signal.

16. The apparatus for determining lateral position of the wire-guided vehicle with respect to the guidewire in accordance with claim 15, further comprising means for approximately normalizing nearwire output as a mirror image of the difference between idealized linear output and said corrected displacement error signal.

17. The apparatus for determining lateral position of the wire-guided vehicle with respect to the guidewire in accordance with claim 15, when one of said guidance channels is out of range, further comprising:

means for directing said wire-guided vehicle to approach said guidewire at an angle of convergence calculated as a function of velocity of said guided vehicle and as a function of distance thereof from said guidewire.

\* \* \* \* \*